United States Patent [19]

Lundin et al.

[11] Patent Number: 4,763,052

[45] Date of Patent: Aug. 9, 1988

[54] METHOD AND MEANS FOR DRIVING A BRUSHLESS D.C. MOTOR

[75] Inventors: Robert S. Lundin, Northfield, Conn.; Demetris C. Petritis, Athens, Greece

[73] Assignee: The Superior Electric Company, Bristol, Conn.

[21] Appl. No.: 66,679

[22] Filed: Jun. 25, 1987

[51] Int. Cl.[4] .............................................. H02P 6/02
[52] U.S. Cl. ..................................... 318/254; 318/342; 318/430; 318/599
[58] Field of Search ............... 318/138, 254, 268, 269, 318/270, 271, 276, 342, 344, 439, 599, 430

[56] References Cited

U.S. PATENT DOCUMENTS

| | | | |
|---|---|---|---|
| 3,349,309 | 10/1967 | Dannettell | 318/139 X |
| 4,081,725 | 3/1978 | Schmidt et al. | 318/484 X |
| 4,307,326 | 12/1981 | Fukushima et al. | 318/342 X |
| 4,527,102 | 7/1985 | Gotou | 318/254 |
| 4,583,028 | 4/1986 | Angersbach et al. | 318/138 X |
| 4,631,458 | 12/1986 | Furuichi | 318/254 |
| 4,665,350 | 5/1987 | Angi et al. | 318/254 |

FOREIGN PATENT DOCUMENTS

| | | | |
|---|---|---|---|
| 60-51490 | 3/1985 | Japan | 318/254 |
| 60-128887 | 7/1985 | Japan | 318/254 |
| 60-216796 | 10/1985 | Japan | 318/254 |

Primary Examiner—Bentsu Ro
Attorney, Agent, or Firm—John H. Crozier

[57] ABSTRACT

A brushless D.C. motor drive circuit provides full available D.C. bus voltage to the motor during periods of motor speed acceleration and deceleration and modulated D.C. voltage to the motor during periods when no demands are made on the motor to accelerate or decelerate, thus avoiding time-lag problems inherent in the type of conventional brushless D.C. motor drive circuits which employ pulse-width modulators to continuously provide modulated D.C. voltage to the motor.

5 Claims, 3 Drawing Sheets

METHOD AND MEANS FOR DRIVING A BRUSHLESS D.C. MOTOR

BACKGROUND OF THE INVENTION

1. Technical Field

This invention relates to circuits, and the operation thereof, for driving brushless D.C. motors, and more particularly to such a circuit that provides for faster response of a brushless D.C. motor during acceleration and deceleration.

2. Background Art

The conventional control of brushless D.C. motors follows the following general pattern:

The A.C. power mains (one-phase or three-phase being the most common) are supplied to a full-wave rectifier with capacitor filtering. The filtered full-wave-rectified output of this operation is essentially a constant voltage D.C. supply with the output voltage varying only as the power mains fluctuate. The filtered D.C. power is supplied to a pulse-width modulator which provides a D.C. output having a voltage which may be varied from "zero" to the full D.C. bus voltage entering the pulse-width modulator from the filtered D.C. power supply. The output voltage of the pulse-width modulator is varied by varying the on-time to off-time ratio, or the "duty cycle", of a switching circuit internal to the pulse-width modulator. Control of this duty cycle is accomplished by comparing speed information feedback from a tachometer, connected to the motor, to a speed set point. The voltage output of the pulse-width modulator is therefore adjusted automatically in the pulse-width modulator to be in equilibrium when the motor speed comports with the set speed.

The voltage output of the pulse-width modulator is supplied to a polyphase switching circuit, which commutates the windings of the motor in concert with the motor shaft position through information from a motor shaft position encoder so that the appropriate windings are energized in accordance with what the shaft position dictates.

The motor may or may not have a current control operating mode. If it does, current information from the motor is fed back to a current limit circuit, which controls chopping in the polyphase switching circuit.

A major disadvantage of the conventional control scheme described above is that the pulse-width modulator has a time constant inherent in its design, which prevents rapid response to command changes. This means that the voltage output from the pulse-width modulator cannot rise suddenly to cause the motor to accelerate rapidly to a higher speed when an acceleration command is given. A similar lag is experienced when a deceleration command is given. Furthermore, the current rise time during acceleration and deceleration is limited to the current rise time determined by the rate of change of the pulse-width modulator output voltage as governed by speed.

SUMMARY OF THE INVENTION

The present invention substantially circumvents the abovedescribed limitations of conventional circuits by providing a brushless D.C. motor drive circuit which furnishes full D.C. bus voltage to the motor during periods of acceleration or deceleration and conventional pulse-width-modulated voltage to the motor during periods when no demands are made on the motor to accelerate or decelerate.

DETAILED DESCRIPTION OF THE PREFERRED EMBODIMENT

Figure 1:
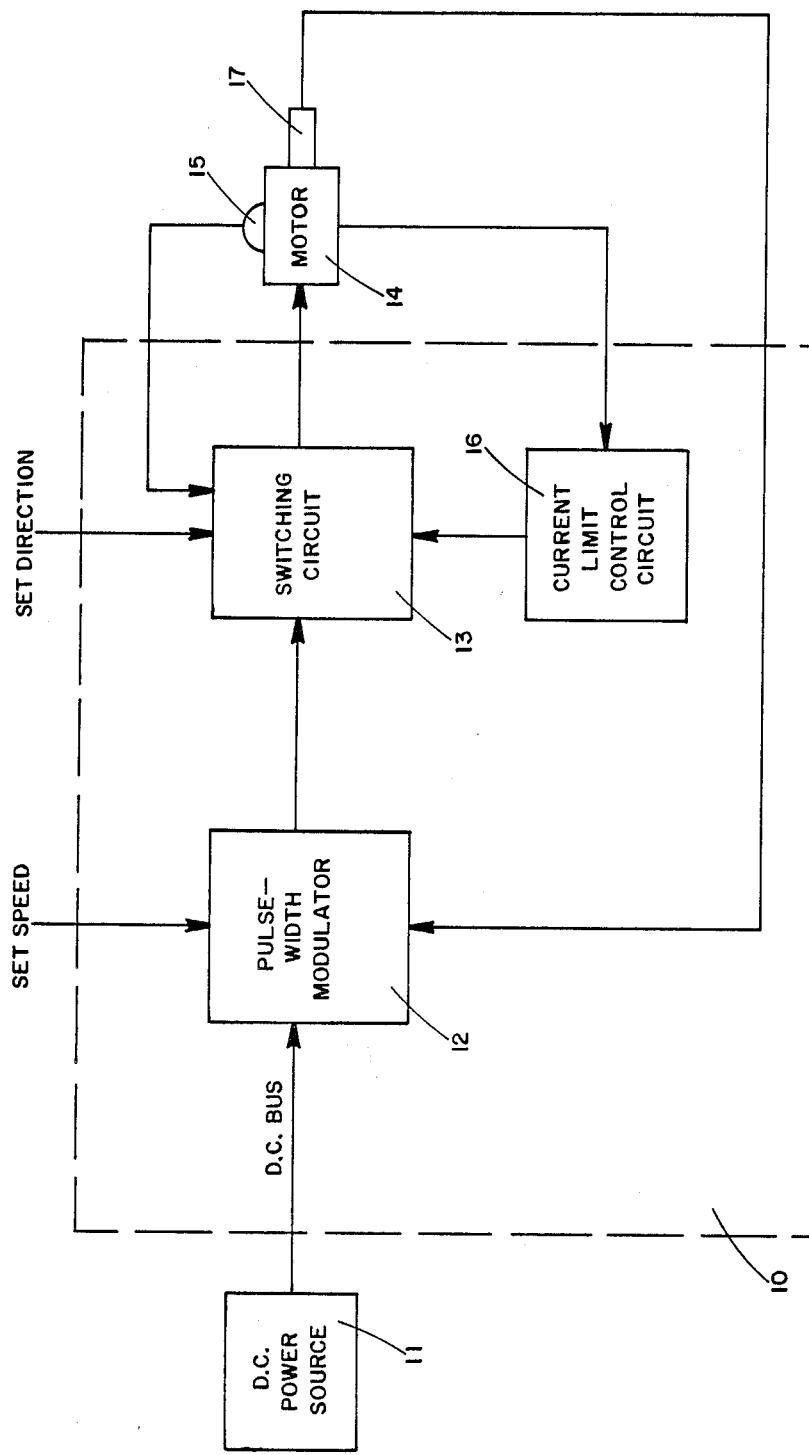
FIG. 1 is a block diagram of a conventional brushless D.C. motor drive circuit.

Referring to the drawing, FIG. 1 is a block diagram of a conventional brushless D.C. motor drive circuit 10 which receives D.C. power from a D.C. power source 11 which provides a rectified D.C. bus input to a pulse-width modulator 12 in the motor drive circuit. Typically, the D.C. power source is a full-wave rectifier having an A.C. input. The pulse-width modulator 12 provides an input voltage to a switching circuit 13 in the motor drive circuit, which in turn provides energization of the windings of a motor 14. A motor shaft position encoder 15 associated with the motor provides position feedback to the switching circuit 13 so that the appropriate phase windings of the motor are energized sequentially and at the appropriate motor shaft position. The switching circuit 13 also receives a "set direction" command and, optionally, an input from a current limit circuit 16 in the motor drive circuit, which receives current information from the motor 14 and which controls current chopping in the switching circuit. Also associated with the motor is a tachometer 17 which provides motor speed feedback to the pulse-width modulator 12. The pulse-width modulator 12 receives a "set speed" command which is compared with the motor speed feedback from the tachometer 17 to control the duty cycle of the pulse-width modulator.

Figure 2:
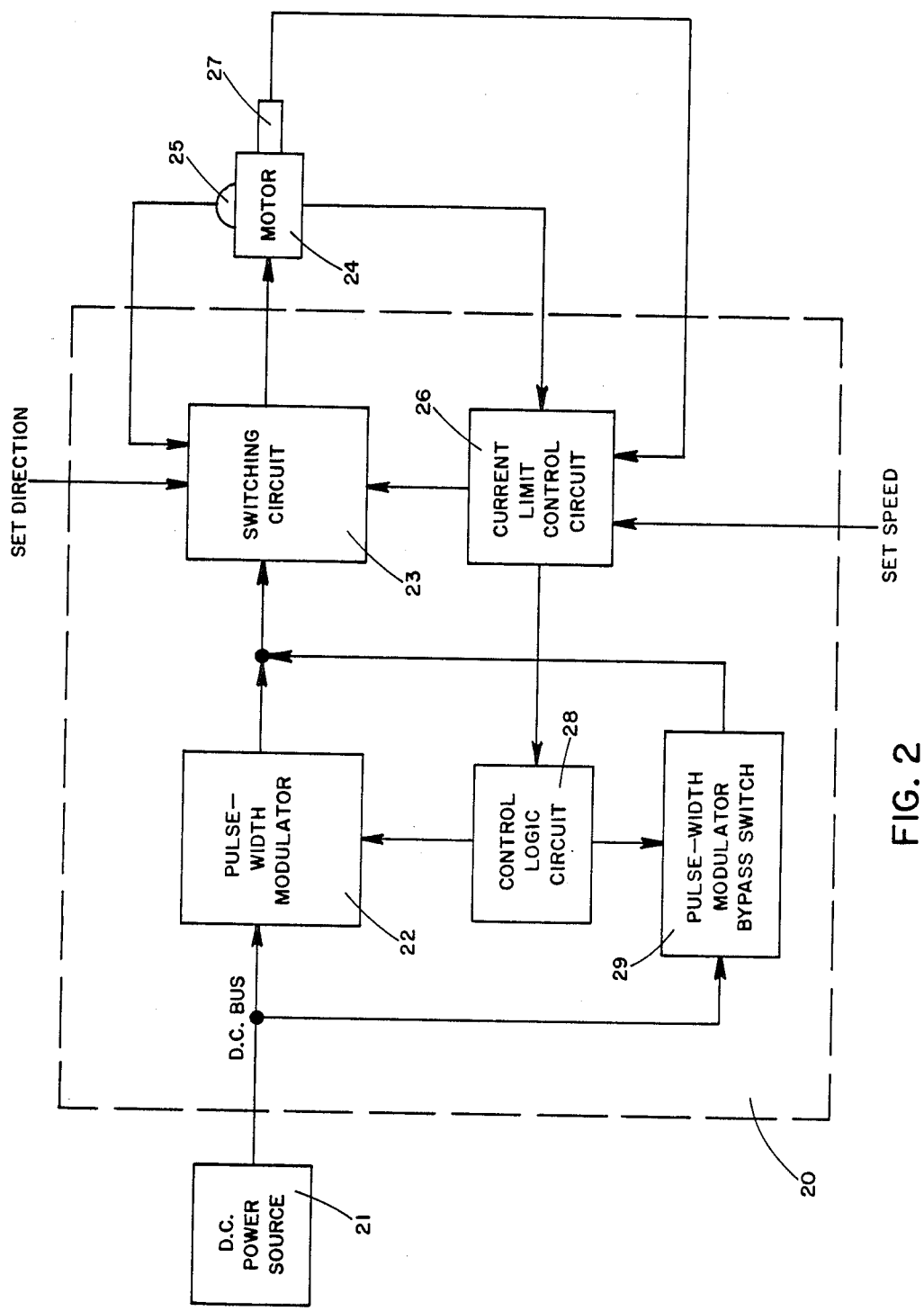
FIG. 2 is a block diagram of a brushless D.C. motor drive circuit according to the present invention.

FIG. 2 shows the brushless D.C. motor drive circuit 20 of the present invention, which receives D.C. power from a D.C. power source 21, and which includes a pulse-width modulator 22, a switching circuit 23, and a current limit control circuit 26, driving a brushless D.C. motor 24 having a motor shaft position encoder 25, all with the interconnections and functions as described above with reference to elements 12, 13, 16, 14, and 15, respectively, of FIG. 1. As with the conventional circuit of FIG. 1, the D.C. power source may be a full-wave rectifier having an A.C. input.

Attached to the motor is a tachometer 27 which, instead of providing an input to the pulse-width modulator 22 as was the case with the conventional circuit of FIG. 1, provides an input to the current limit control circuit 26 which also receives a "set speed" command and which in turn provides inputs to the switching circuit 23 for current chopping control and to a control logic circuit 28 for commutation rate and current level information. The control logic circuit 28 provides a signal to control the duty cycle of the pulse-width modulator 22 and provides a signal to open or close a pulse-width modulator bypass switch 29 which, when closed, connects the D.C. bus directly to the switching circuit 23.

In the operation of the circuit of FIG. 2, full bus voltage is available to the motor 24 for acceleration and deceleration through the closing of the pulse-width modulator bypass switch 29. The pulse-width modulator bypass switch 29 is controlled by the control logic circuit 28 which recognizes whether or not the current limit control circuit 26 has been satisfied by the winding current in the motor 24 reaching its set level. Until the current limit control circuit 26 is satisfied, the pulse-width modulator bypass switch 29 is closed, thus bypassing the effect of the pulse-width modulator 22 on voltage supplied to the motor 24. As soon as the current limit control circuit 26 is satisfied, the pulse-width modulator bypass switch 29 is opened causing the voltage to the motor 24 to drop from full bus voltage to some lower value of D.C. voltage, the value of which is determined by the limitation of the chopping frequency of the pulse-width modulator 22. It is to be noted that the chopping of the phase current to control or limit the current precludes application of high bus voltages such as are advantageous during acceleration and deceleration because either the chopping frequency would become impractically high or the differential in current in the chopping cycle would have to be impractically high. The present invention permits the application of high D.C. bus voltages to the motor 24 during acceleration and deceleration (limited only by device ratings) with application of a lower voltage as soon as chopping starts, the value of that voltage being determined by the limit of chopping frequency and the desired differential between on- and off-current points during chopping.

As an additional advantage, the speed control feedback from the tachometer 27 cooperates with the current limit control circuit 26, rather than the pulse-width modulator 22, thereby permitting faster response to command changes in speeds.

Figure 3:
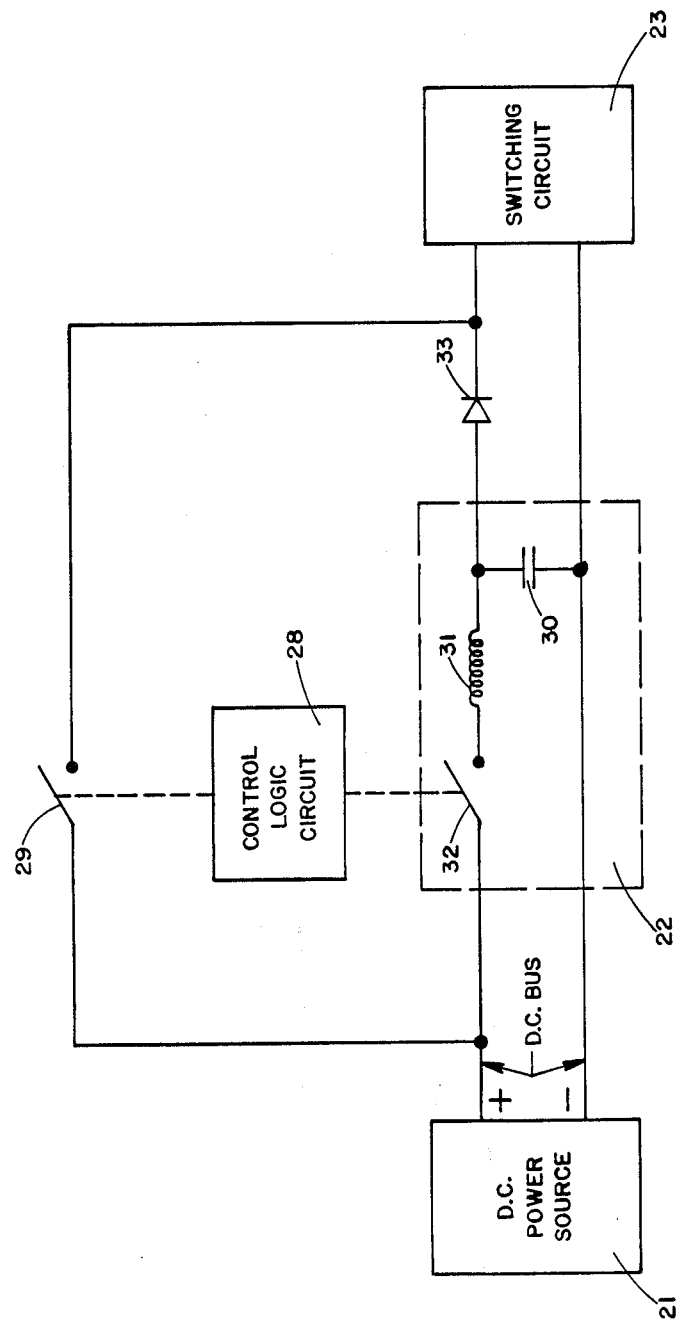
FIG. 3 is a block/electrical diagram showing a detail of the circuit of FIG. 2.

FIG. 3 shows a detail of the circuit of FIG. 2, which detail includes the pulse-width modulator 22 and the pulse-width modulator bypass switch 29 connected as shown between the D.C. power source 21 and the switching circuit 23. The pulse-width modulator 22 includes a capacitor 30, an inductor 31, and a switch 32. The duty cycle of the pulse-width modulator 22 is determined by the required voltage to the switching circuit 23 and is maintained by the opening and closing of switch 32, which opening and closing is controlled by a signal from the control logic circuit 28. The opening and closing of the pulse-width modulator bypass switch 29 is controlled by a second signal from the control logic circuit 28. A diode 33 is connected as shown to prevent current flow back into the pulse-width modulator 22 when the pulse-width modulator bypass switch 29 is closed.

It will be understood that what has been disclosed is a novel brushless D.C. motor drive circuit which provides modulated drive voltage during periods when no demands are made on the motor to accelerate or decelerate, while providing full D.C. bus voltage during periods of motor speed acceleration or deceleration.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

We claim:

1. A circuit for driving a brushless D.C. motor, comprising:
   (a) modulating means for modulating a D.C. voltage;
   (b) switching means, responsive to a direction set point signal and a signal from shaft position encoding means which senses the position of the motor shaft, for receiving the modulated D.C. voltage and energizing the motor to provide desired speed and direction;
   (c) bypass means for providing full D.C. voltage to the switching means; and
   (d) control means, responsive to speed and current levels of the motor, for alternately activating the modulating means and the bypass means, whereby the modulating means is activated during periods when no demands are made on the motor to accelerate or decelerate and the bypass means is activated during periods when demands are made on the motor to accelerate or decelerate.

2. The circuit for driving a brushless D.C. motor, as defined in claim 1, wherein the control means comprises:
   (a) a current limit control circuit which receives inputs of a current level signal from the motor, a signal from tachometer means which senses the speed of the motor, and a speed set point signal; and
   (b) a control logic circuit which is responsive to a signal from the current limit control circuit and provides output signals to activate the modulating means during periods of no motor speed acceleration or deceleration and to activate the bypass means during periods of motor speed acceleration or deceleration.

3. The circuit for driving a brushless D.C. motor, as defined in claim 2, wherein the current limit control circuit further provides a signal to control current chopping in the switching means.

4. The circuit for driving a brushless D.C. motor, as defined in claim 3, wherein the modulating means comprises a pulse-width modulator.

5. A circuit for driving a brushless D.C. motor, comprising:
   (a) a D.C. bus adapted to receive a D.C. voltage from a D.C. power source:
   (b) a pulse-width modulator connected to the D.C. bus;
   (c) a pulse-width modulator bypass switch connected to the D.C. bus;
   (d) a control logic circuit connected to control the pulse-width modulator and to activate the pulse-width modulator bypass switch;
   (e) a current limit control circuit connected to receive as inputs a "set speed" command, a current level signal from the motor, and motor speed information from a tachometer which senses the speed of the motor, and connected to provide an input control signal to the control logic circuit; and
   (f) a switching circuit connected to receive as inputs D.C. voltage from the pulse-width modulator and the pulse-width modulator bypass switch, a signal from the current limit control circuit to control chopping in the switching circuit, a "set direction" command, and a shaft position signal from an encoder which senses the position of the motor shaft and adapted to provide energization of the windings of the motor;

whereby the control logic circuit, in response to the control signal from the current limit control circuit will activate and control the pulse-width modulator during periods of no motor speed acceleration or deceleration to provide modulated D.C. voltage to the switching circuit and will activate the pulse-width modulator bypass switch to provide D.C. bus voltage to the switching circuit during periods of acceleration or deceleration.

* * * * *